United States Patent
Kang et al.

(10) Patent No.: US 9,821,460 B2
(45) Date of Patent: Nov. 21, 2017

(54) OMNIDIRECTIONAL MOVING ROBOT DEVICE, AND SYSTEM AND METHOD FOR OBJECT CONVEYANCE USING THE SAME

(71) Applicant: Daegu Gyeongbuk Institute of Science and Technology, Dalseong-gun, Daegu (KR)

(72) Inventors: Tae Hun Kang, Daegu (KR); Hee Jin Park, Daegu (KR); Jeon Il Moon, Seongnam-si (KR)

(73) Assignee: Daegu Gyeongbuk Institute of Science and Technology, Dalseong-gun, Daegu (KR)

( * ) Notice: Subject to any disclaimer, the term of this patent is extended or adjusted under 35 U.S.C. 154(b) by 0 days.

(21) Appl. No.: 14/929,716

(22) Filed: Nov. 2, 2015

(65) Prior Publication Data

US 2017/0120443 A1     May 4, 2017

(51) Int. Cl.
| | |
|---|---|
| *B25J 9/16* | (2006.01) |
| *B25J 9/00* | (2006.01) |
| *B25J 5/00* | (2006.01) |
| *B25J 13/08* | (2006.01) |
| *G06Q 30/02* | (2012.01) |
| *B66F 9/06* | (2006.01) |
| *G05D 1/02* | (2006.01) |

(52) U.S. Cl.
CPC .......... *B25J 9/1633* (2013.01); *B25J 5/007* (2013.01); *B25J 9/0057* (2013.01); *B25J 9/0084* (2013.01); *B25J 9/1694* (2013.01); *B25J 13/085* (2013.01); *G05D 1/0293* (2013.01); *B66F 9/063* (2013.01); *G05D 2201/0216* (2013.01); *G06Q 30/02* (2013.01); *Y10S 901/01* (2013.01)

(58) Field of Classification Search
CPC ...... G06Q 30/02; B25J 13/085; Y10S 901/01; B66F 9/063
See application file for complete search history.

(56) References Cited

U.S. PATENT DOCUMENTS

| | | | | |
|---|---|---|---|---|
| 2009/0035739 | A1* | 2/2009 | Alemzadeh | A61C 11/00 434/264 |
| 2015/0142249 | A1* | 5/2015 | Ooga | B66F 9/063 701/23 |
| 2015/0323398 | A1* | 11/2015 | Lauzier | B25J 9/0081 73/862.08 |
| 2016/0332298 | A1* | 11/2016 | Garrod | B25J 9/163 |

FOREIGN PATENT DOCUMENTS

| | | |
|---|---|---|
| JP | 2010-064672 A | 3/2010 |
| WO | WO 2015171593 A1 * 11/2015 | ............ B25J 9/1682 |

OTHER PUBLICATIONS

Korean Intellectual Property Office; Communication dated Jan. 26, 2017 in counterpart application No. 10-2015-0110670.
"Design of Force Plate based on Stewart Platform," Proceedings of the 14th KACC, Oct. 1999 (4 pages total).

* cited by examiner

*Primary Examiner* — Thomas Ingram
(74) *Attorney, Agent, or Firm* — Sughrue Mion, PLLC (57) ABSTRACT

Provided are an omnidirectional moving robot device, and a system and method for object conveyance using a plurality of moving robot devices. The omnidirectional moving robot device includes a sensor, a traveling unit including an omnidirectional wheel disposed in a housing, and a control unit configured to transmit a traveling command signal to the traveling unit by using data measured by the sensor.

10 Claims, 9 Drawing Sheets

OMNIDIRECTIONAL MOVING ROBOT DEVICE, AND SYSTEM AND METHOD FOR OBJECT CONVEYANCE USING THE SAME

TECHNICAL FIELD

The present invention relates to an omnidirectional moving robot device, and a system and method for object conveyance using a plurality of moving robot devices.

BACKGROUND

Various moving robots have been proposed to meet the demand for conveying an object from a current location to a target location.

As for a related art moving robot, a specification of the moving robot is determined according to a shape of an object (a raw material or a component) to be conveyed, and thus, it is inevitable to introduce multiple types of moving robots.

In addition, since specifications of moving robots should be determined with respect to objects having various sizes and various payloads, a middle/large moving robot having a maximum available range (size, payload) should be retained inevitably.

That is, when it is assumed that a specific moving robot is provided, if an object having a size and payload exceeding a conveyance range is to be conveyed, the specific moving robot may not be used, and thus, a middle/large moving robot should be retained in consideration of a maximum available range.

This is a conveyance scheme consuming a huge amount of unnecessary cost in a distribution process in businesses, which is not economical and ineffective.

SUMMARY

Accordingly, the present invention provides a technique of conveying objects having various shapes and sizes by utilizing force and torque information and through cooperation between moving robots.

In one general aspect, an omnidirectional moving robot device includes: a sensor; a traveling unit including an omnidirectional wheel disposed in a housing; and a control unit configured to transmit a traveling command signal to the traveling unit by using data measured by the sensor.

In another general aspect, a system for object conveyance using an omnidirectional moving robot device including a force/torque sensor includes: a master moving robot including a first force/torque sensor; and a slave moving robot configured to transmit data obtained by a second force/torque sensor to the master moving robot and travel upon receiving a traveling command signal from the master moving robot.

In another general aspect, a method for object conveyance using an omnidirectional moving robot device including a force/torque sensor includes: receiving target speed and direction data regarding object conveyance; obtaining IDs and force/torque sensor values of a master moving robot and a slave moving robot; and transmitting a traveling command signal generated by using the force/torque sensor values to convey an object in the target speed and direction.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
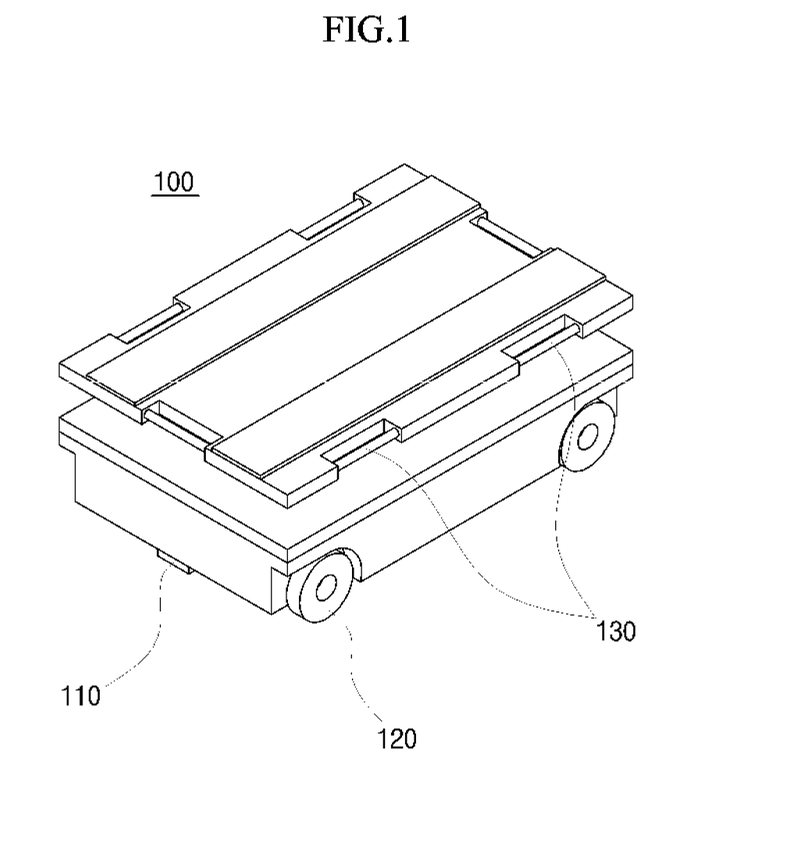
FIG. 1 is a perspective view illustrating an omnidirectional moving robot device including a force/torque sensor according to an embodiment of the present invention.
Figure 2:
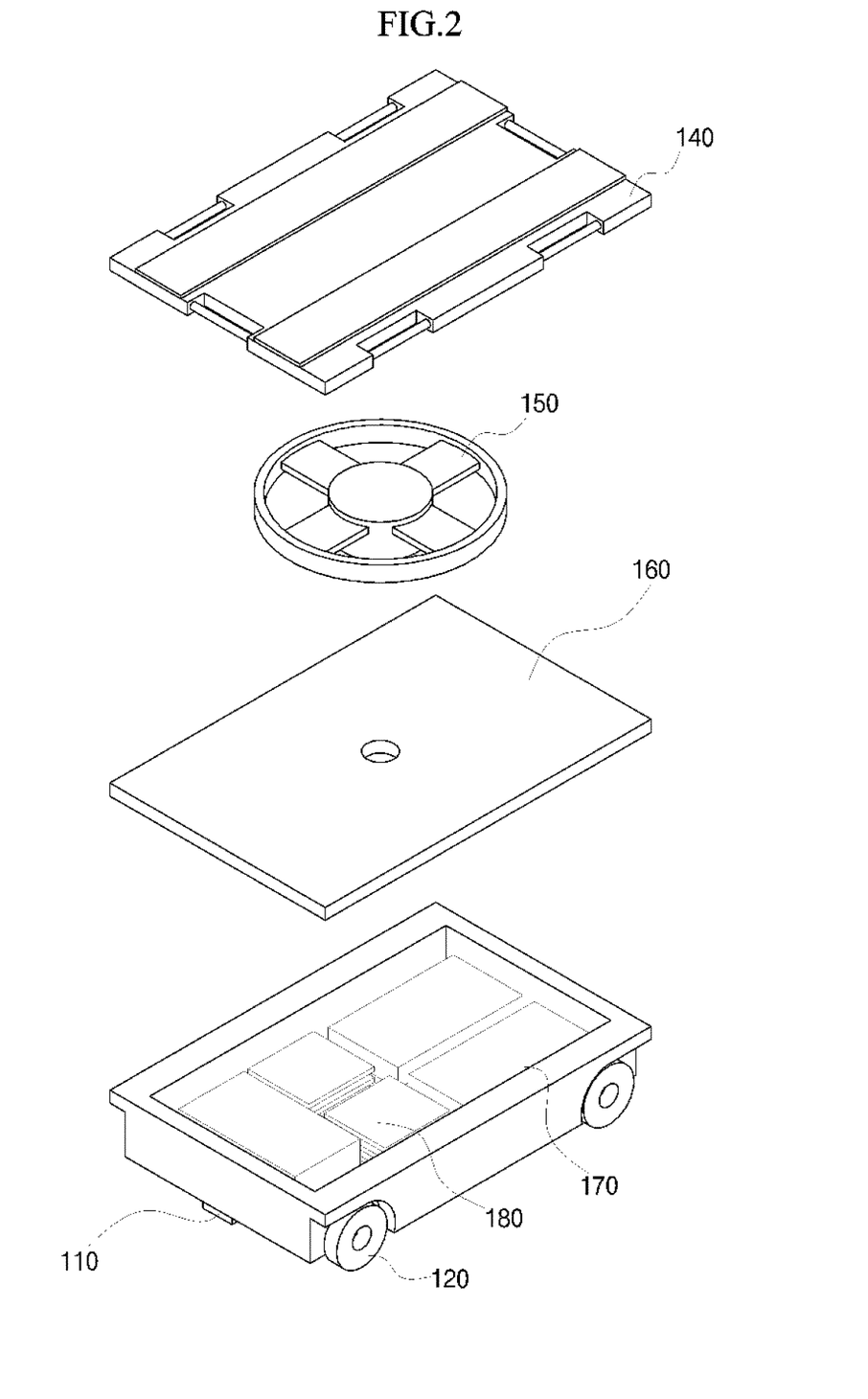
FIG. 2 is an exploded perspective view illustrating the omnidirectional moving robot device including a force/torque sensor according to an embodiment of the present invention.

In an embodiment of the present invention, a plurality of omnidirectional moving robot devices each including a force/torque sensor are provided to constitute a system for object conveyance. FIGS. 1 and 2 are a perspective view and an exploded perspective view illustrating an omnidirectional moving robot device including a force/torque sensor constituting such a system.

Figure 3:
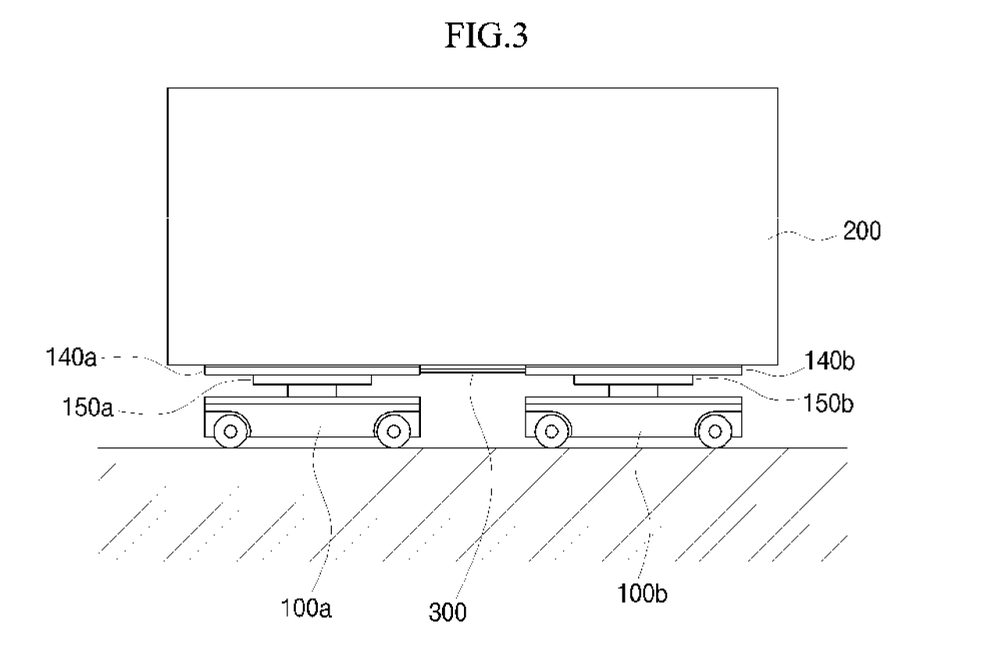
FIG. 3 is a conceptual view illustrating conveyance of an object by a plurality of moving robots using a connection link according to an embodiment of the present invention.

In the descriptions of FIGS. 1 and 2, a master moving robot in the system configuration described hereinafter will be described, and a system for conveying an object through cooperation between a master moving robot and a slave moving robot will be described in detail with reference to accompanying drawings after FIG. 3.

As illustrated in FIGS. 1 and 2, an omnidirectional moving robot device 100 including a force/torque sensor includes a force/torque sensor 150 disposed within a housing, a traveling unit including an omnidirectional wheel 120 disposed in the housing, and a control unit 180 transferring a traveling command signal to the traveling unit by using data measured by the force/torque sensor 150.

Here, the traveling unit includes a plurality of wheels 120 driven in omnidirections, and here, three or more wheels are provided. Also, in an embodiment of the present invention, the control unit 180 includes a controller transferring a travelling command signal to the traveling unit and a motor driver.

The omnidirectional moving robot device including a force/torque sensor according to an embodiment of the present invention includes a line scanner 110, a connection port 130 as a portion coupled to a connecting rod 300 (to be described hereinafter), and a battery 170 supplying power.

The force/torque sensor 150 according to an embodiment of the present invention, a multi-axis force/torque sensor disposed within the housing, is disposed between an upper plate 140 and a lower plate 160 to measure force components ($f_x$, $f_y$, $f_z$) with respect to x, y, and z axes and torque ($\tau$) of one component.

The omnidirectional moving robot device including the force/torque sensor according to an embodiment of the present invention includes the connection port 130 as an interface coupled to the connecting rod 300 connecting the upper plate 120 constituting the housing and an upper plate of other moving robot device.

Also, preferably, the omnidirectional moving robot device including the force/torque sensor according to an embodiment of the present invention further includes a communication unit receiving force and torque data obtained by a force/torque sensor of other moving robot.

That is, the control unit 180 according to an embodiment of the present invention transmits a traveling command signal according to a target value determined by using the data measured by the force/torque sensor 150 and the force and torque data from the other moving robot device obtained by the communication unit, to the traveling unit.

For example, when a force component obtained by the force/torque sensor of the omnidirectional moving robot device including the force/torque sensor according to an embodiment of the present invention is $F_i$ and a torque component is $T_i$ and force components obtained by the force/torque sensors of two other moving robot devices are $F_{n-1}$ and $F_n$, respectively, and torque components are $\tau_{n-1}$ and $\tau_n$, respectively, a target force value is a value obtained by adding $F_i$, $F_{n-1}$, and $F_n$, and a target torque value is a value obtained by adding $\tau_i$, $\tau_{n-1}$, and $\tau_n$.

The control unit 180 of the omnidirectional moving robot device including the force/torque sensor according to an embodiment of the present invention controls traveling of the moving robot such that the sums of the measured forces and torques follow a target force value and a target torque value.

Figure 4:
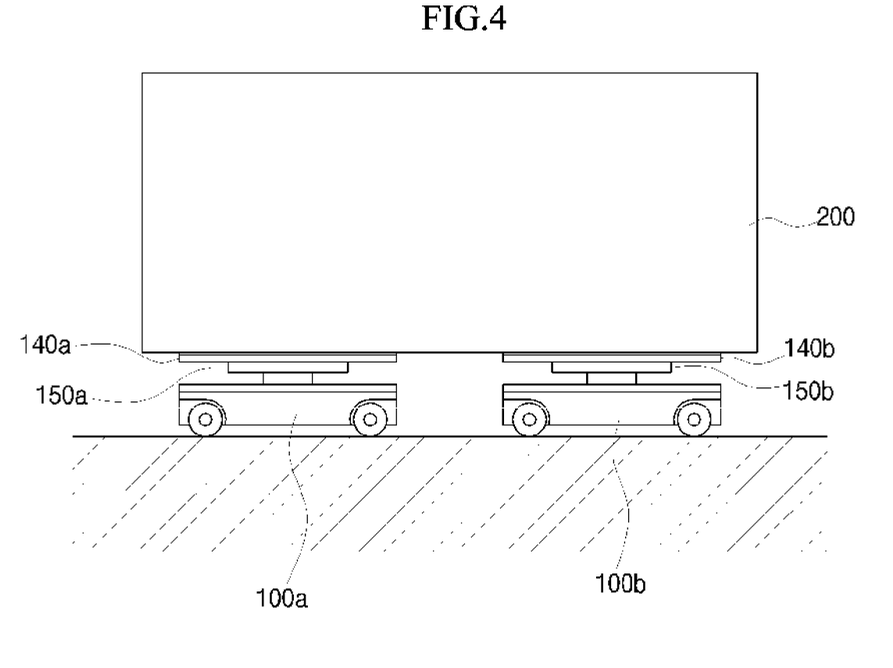
FIG. 4 is a conceptual view illustrating conveyance of an object independently using a plurality of moving robots without using a connection link according to an embodiment of the present invention.
Figure 5:
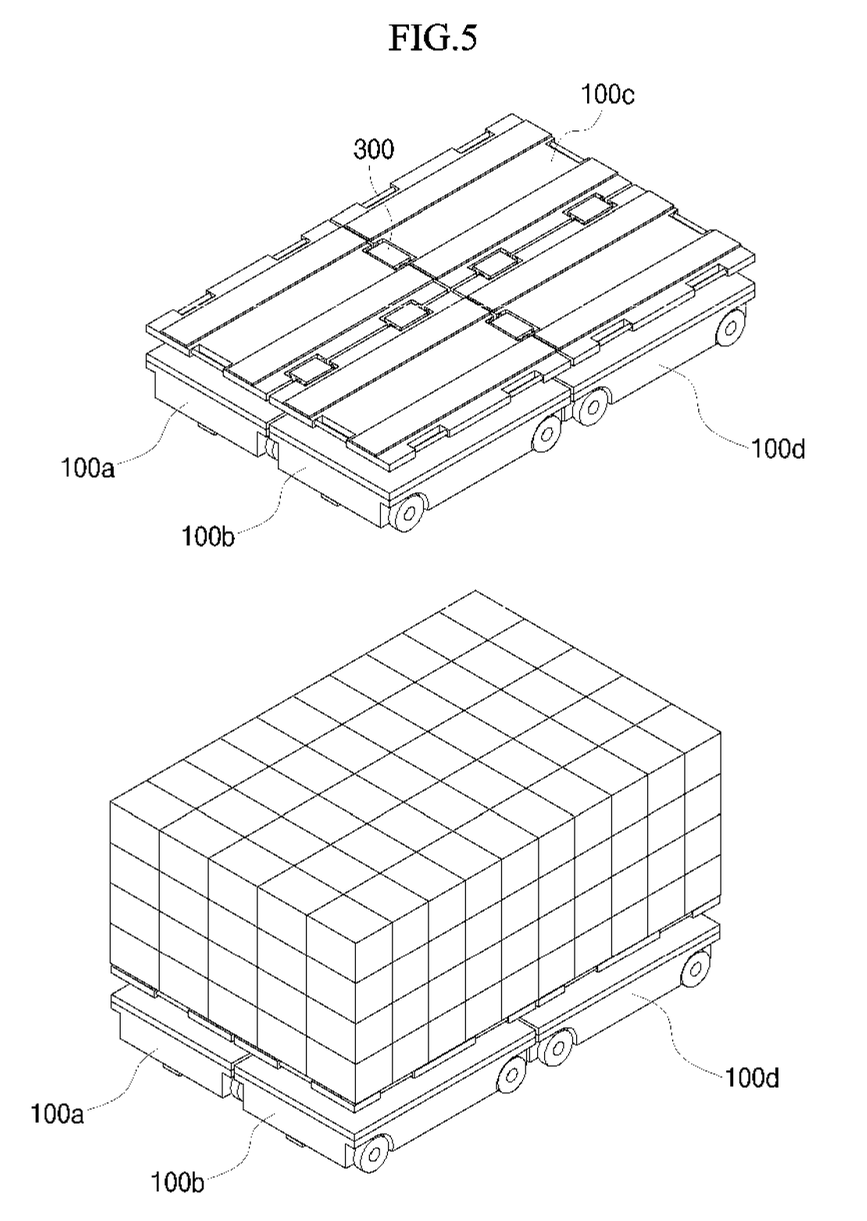
FIG. 5 is conceptual view illustrating conveyance of an object by a plurality of moving robots using a connection link according to an embodiment of the present invention.
Figure 6:
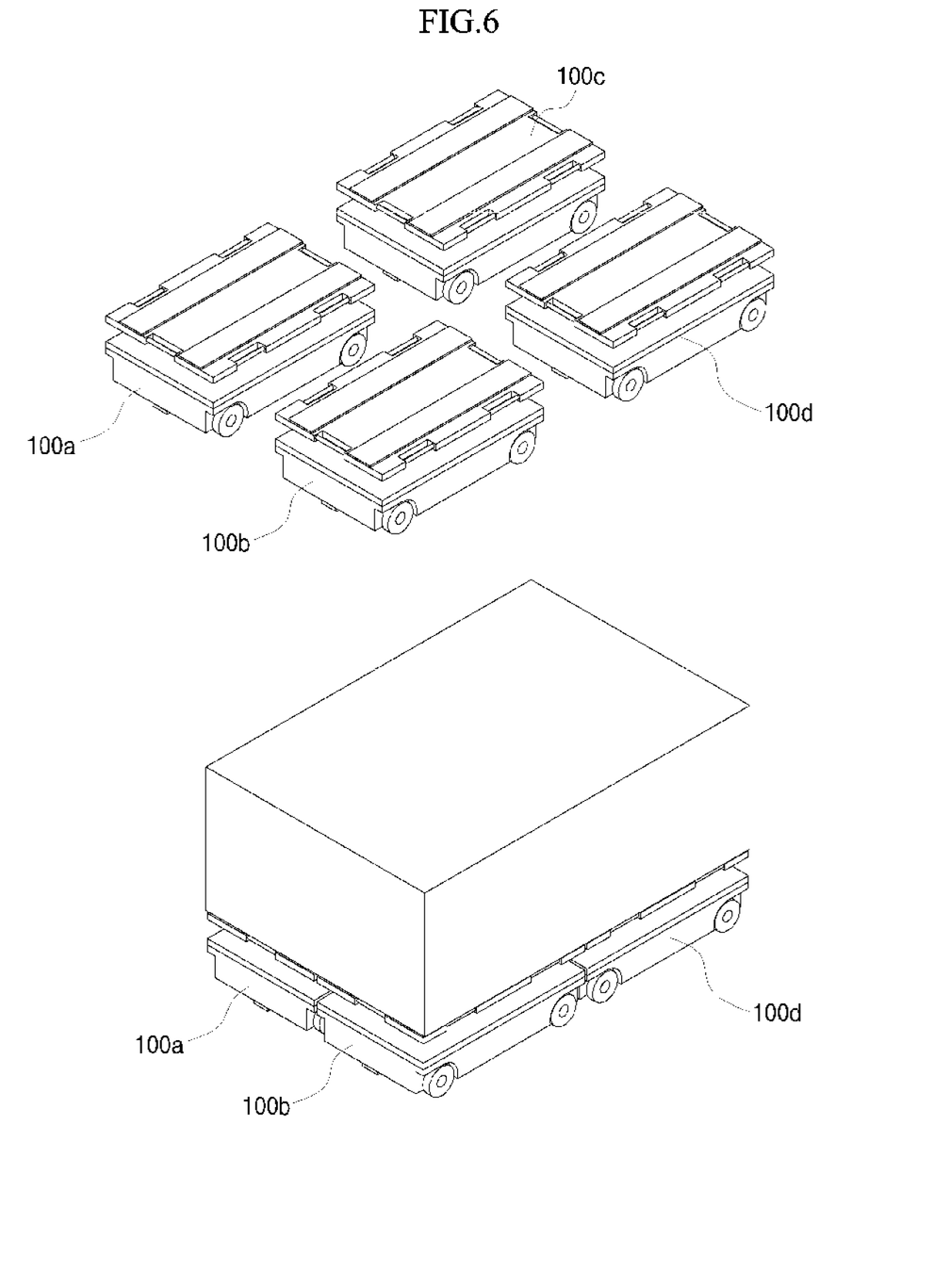
FIG. 6 is a conceptual view illustrating conveyance of an object independently using a plurality of moving robots according to an embodiment of the present invention.

A plurality of omnidirectional moving robots including the force/torque sensor according to an embodiment of the present invention constitute a system for object conveyance. FIGS. 3 and 5 are views illustrating conveyance of an object by a plurality of moving robots using a connection link according to an embodiment of the present invention, and FIGS. 4 and 6 are views illustrating conveyance of an object independently using a plurality of moving robots without using a connection link according to an embodiment of the present invention.

In the description of FIGS. 3 through 6, in order to help understand a person skilled in the art, the master moving robot 100a and the slave moving robots 100b, 100c, and 100d will be classified and described.

The system for object conveyance using the omnidirectional moving robot including a force/torque sensor according to an embodiment of the present invention includes a master moving robot 100a including a first force/toque sensor 150a and a slave moving robot 100b transferring data obtained by a second force/torque sensor 150b to the master moving robot 100a and traveling upon receiving a traveling command signal from the master moving robot 100a.

Configurations of the master moving robot 100a and the slave moving robot 100b are illustrated in FIGS. 1 and 2.

The system for object conveyance using the omnidirectional moving robot including a force/torque sensor according to an embodiment of the present invention have embodiments different according to connection schemes, an embodiment in which a plurality of moving robots are connected using connection links will be described as a first embodiment and an embodiment in which a plurality of moving robots are independently used without a connection link will be described as a second embodiment.

According to the first embodiment, the master moving robot 100a and the slave moving robot 100b are connected by a connection port and a connecting rod 300 disposed in each of upper plate portions 140a and 140b. That is, as illustrated in FIG. 5, according to the first embodiment, the upper plate portion of the master moving robot 100a and the upper plate portions of slave moving robots 100b, 100c, and 100d form a single large upper plate, and an object 200 is disposed on the upper plate and conveyed.

According to the second embodiment, the master moving robot 100a and the slave moving robot 100b are disposed to be spaced apart from one another without a connection member, and as illustrated in FIG. 6, an upper plate portion of each of the moving robots supports the object to perform a conveyance operation.

The master moving robot 100a according to an embodiment of the present invention adds the force/torque data obtained by the first force/torque sensor 104a, the force/torque data obtained by the second force/torque sensor 150b to generate target force and target torque values and transmits a corresponding traveling command signal.

That is, when a target speed and direction for conveying an object are determined, the master moving robot 100a and the slave moving robots 100b, 100c, and 100d measure force/torque data thereof to determine a target force through a force control algorithm, and correct the driving speeds of the master moving robot 100a and the slave moving robots 100b, 100c, and 100d to correspond to the target speed.

Here, the target force value is a value obtained by adding force data measured by the force/torque sensors of the master moving robot 100a and the slave moving robots 100b, 100c, and 100d, and the target torque value is a value obtained by adding the torque data measured by the force/torque sensors of the master moving robot 100a and the slave moving robots 100b, 100c, and 100d.

Figure 7:
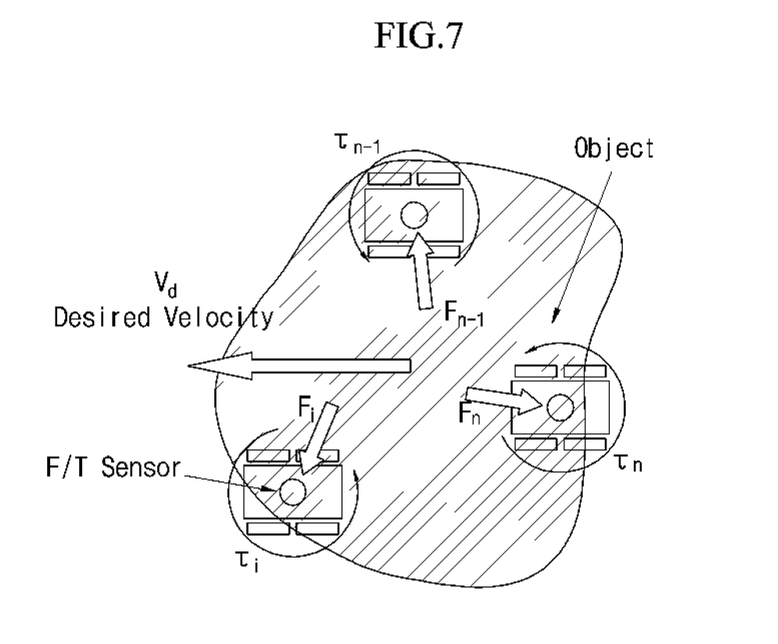
FIG. 7 is a conceptual view illustrating cooperation using force control of a plurality of moving robots according to an embodiment of the present invention.

As illustrated in FIG. 7, when a target speed is defined as $V_d$, the master moving robot controls the overall system to follow the target force value ($F_d$) and the target torque value ($\tau_{n-1}$) as sums of the measured forces and torques.

Here, the target force value ($F_d$) and the target torque value ($\tau_{n-1}$) are calculated through Equation 1 and Equation 2 as follows.

$$\sum_{i=1}^{n} f_i = F_d \quad (1)$$

$$\sum_{i=1}^{n} \tau_i = \tau_d \quad (2)$$

Even when a force/torque sensor is installed and information thereof is to be utilized for cooperation of a plurality of robots, since payload of the robots is extremely limited to lead to limited applicability. Thus, another embodiment of the present invention overcoming the problem will be described.

Figure 8:
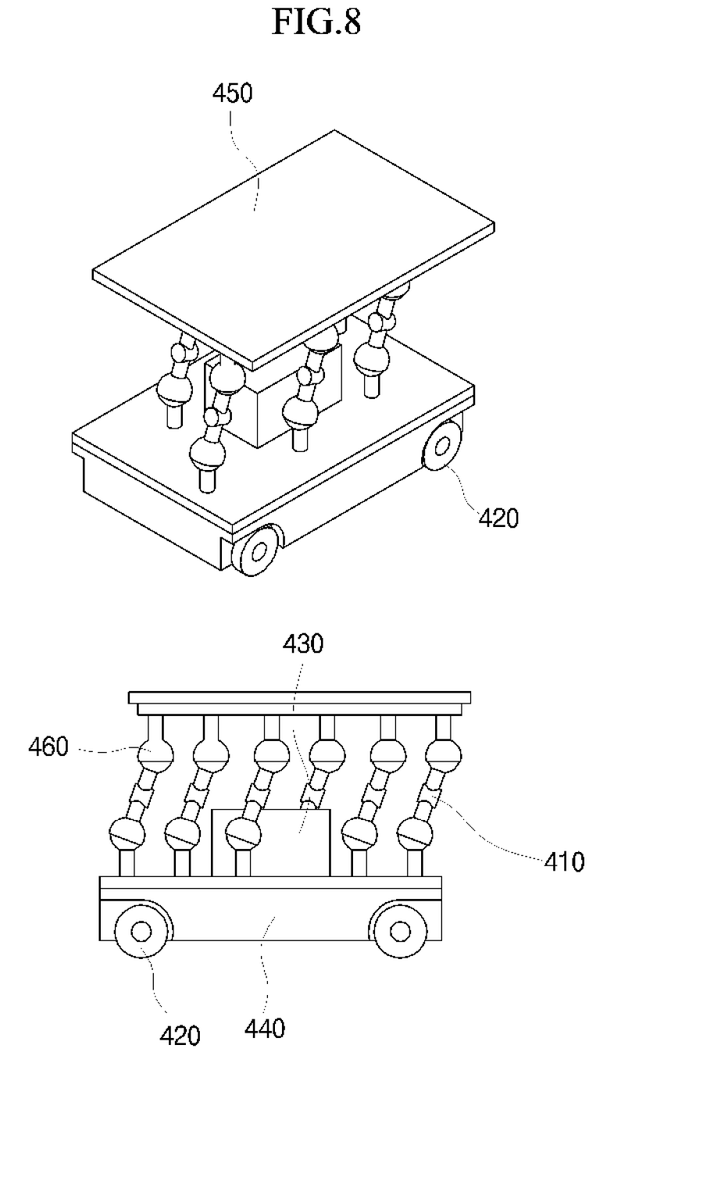
FIG. 8 is a view illustrating an omnidirectional moving robot device according to another embodiment of the present invention.

As illustrated in FIG. 8, an omnidirectional moving robot device according to another embodiment of the present invention includes a sensor 410, a traveling unit including an omnidirectional wheel 420 disposed in a housing, and a control unit 430 transmitting a traveling command signal to the traveling by using data measured by the sensor 410.

The omnidirectional wheel 420 may be configured as any one of a mecanum wheel, an onmi-wheel, and a swivel wheel, and the sensor 410 is a one-axis force sensor disposed at each link of a stewart platform connecting a lower plate 440 forming a robot body and an upper plate 450 on which an object to be conveyed is mounted.

As illustrated in FIG. 8, the one-axis force sensor 410 is disposed between joints 460 constituting each link.

According to another embodiment of the present invention, a current moving speed of the omnidirectional moving robot device is obtained by using encoder data, and stewart platform forward kinetics interpretation and statics interpretation are performed thereon.

A total of six one-axis force sensors 410 are disposed and six-axis force/torque information using six force sensor information is calculated, and a calculation value is produced through a force control algorithm.

That is, the control unit 430 obtains one-axis compressive force or tensile force data in an axial direction measured by the one-axis force sensor 410 and performs the force control algorithm, calls a target force/torque value to be applied to a robot, compares the called target force/torque value with the foregoing calculation value, and determines whether to maintain or change the current traveling speed according to the comparison result.

When a control command for maintaining the current traveling speed is transmitted, the omnidirectional wheel 420 is driven to maintain the current traveling speed, and when the speed is to be changed, a feedback loop of returning to the stewart platform forward dynamics interpretation is performed.

The method for conveying an object using the omnidirectional moving robot including a force/torque sensor according to an embodiment of the present invention includes receiving a target speed and direction data regarding object conveyance; obtaining an ID and a force/torque sensor value of a master moving robot and a slave moving robot; and transmitting a traveling command signal generated by using the force/torque sensor value to convey an object to the target speed and direction.

Figure 9:
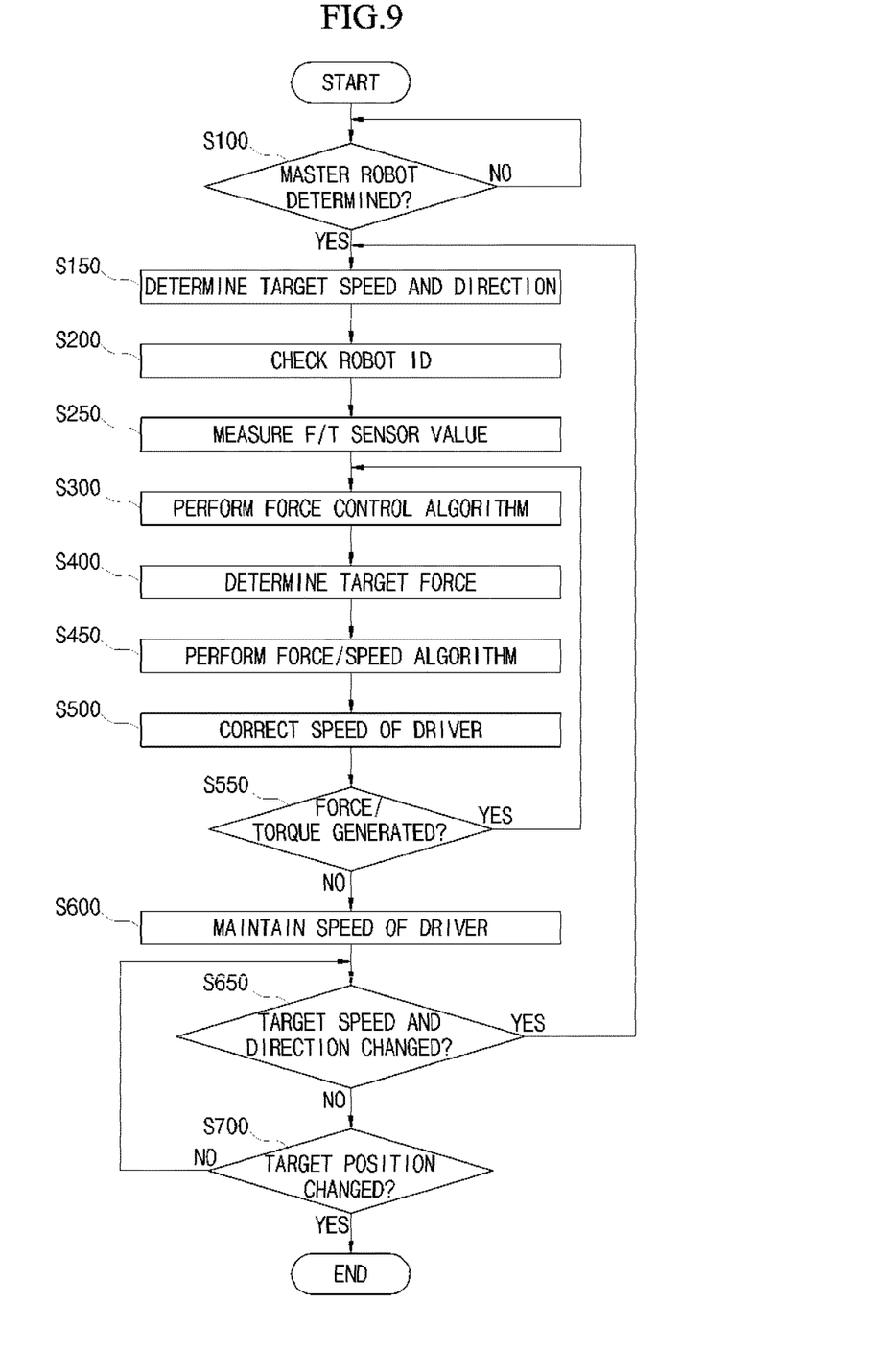
FIG. 9 is a flow chart illustrating a method for conveying an object using an omnidirectional moving robot including a force/torque sensor according to an embodiment of the present invention.

FIG. 9 is a flow chart illustrating a method for conveying an object using an omnidirectional moving robot including a force/torque sensor according to an embodiment of the present invention.

When a master moving robot is determined in step S100, a target speed and direction of object conveyance are determined in step S150. When a total number of moving robots constituting a system for object conveyance is N, N number of robot IDs are identified in step S200, and data measured by a force/torque sensor of each of the N number of moving robots is collected in step S250.

A force control algorithm is executed by using the data measured by the force/torque sensor of each of the moving robots in step S300 to determine a target force in step S400. Here, a target force is a value obtained by adding the force data measured by each of the force/torque sensors.

When the target force is determined, a force/speed algorithm is executed in step S450, and a speed of a driver is corrected to correspond to the target speed in step S500.

Whether a force/torque is generated while the object is being conveyed according to the corrected speed of the driver is monitored in step S550, and when a force/torque is generated, the force control algorithm is re-executed to newly determine a target force in step S300, and when a force/torque is not generated, the existing corrected speed of the driver is maintained in step S600.

Also, in the method for conveying an object using an omnidirectional moving robot including a force/torque sensor according to an embodiment of the present invention, whether a target speed and direction are changed is monitored in step S650. When the target speed and direction are changed, the process is returned to the foregoing step S150, and when the target speed and direction are not changed, whether conveyance of the object to the target position is completed is monitored in step S700. When the object has been conveyed to the target position, the conveyance is completed.

According to an embodiment of the present invention, since the moving robot having a force/torque sensor and a cooperation solution is provided between the moving robots, objects having various shapes and sizes may be conveyed without having to retain a middle and/large moving robot having a maximum available range (size and payload).

Since data obtained by the force/torque sensor included in the moving robot is shared, it is possible to convey an object at a target speed and in a target direction by using a minimum number of moving robots, eliminating the necessity of a moving cart or a middle and large moving robot, whereby an effect of reducing initial retain cost and maintenance cost.

The present invention may be applied to a field of releasing articles of business and recognizing an inventory on the basis of communication such as electronic transaction, in particular, TV home shopping, or an Internet shopping mall, and may convey an object from a warehouse at the time when a consumer selects an article, whereby an order may be quickly handled.

The present invention may be applied to a field of managing warehouse of a large mart, and when a shortage is to be covered according to a real time inventory management and a sales volume, an object may be effectively conveyed to reduce an extra resource within a warehouse and it may be utilized as a resource for enhancing a client service.

The present invention may be applied to a line of a small business in which a warehouse and a production line coexist to organize a complete product from supply of a raw material regarding a production line and recognize real time inventory.

According to an embodiment of the present invention, in controlling a force for cooperation between a plurality of robots, multi-axis force/torque sensor information may be obtained by utilizing a sensor disposed at each link of a parallel structure in the form of a stewart platform.

The effect of the present invention is not limited to the aforesaid, but other effects not described herein will be clearly understood by those skilled in the art from descriptions above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An omnidirectional moving robot device comprising:
   a sensor;
   a traveling unit including an omnidirectional wheel disposed in a housing; and
   a control unit configured to transmit a traveling command signal to the traveling unit by using data measured by the sensor,
   wherein the sensor comprises a one-axis force sensor, and the controller obtains one-axis compressive force or tensile force data in an axial direction measured by the one-axis force sensor and performs a force control algorithm to generate a calculation value, calls a target force/torque value to be applied to a robot, compares the called target force/torque value with the calculation value, and determines whether to maintain or change a current traveling speed according to a comparison result.

2. The omnidirectional moving robot device of claim 1, wherein the sensor further comprises a multi-axis force/torque sensor disposed within the housing.

3. The omnidirectional moving robot device of claim 1, further comprising:
   a connection port coupled to a connecting rod connecting an upper plate constituting the housing and an upper plate of another moving robot device.

4. The omnidirectional moving robot device of claim 1, further comprising:
   a communication unit configured to receive force and torque data obtained by a force/torque sensor of another moving robot device.

5. The omnidirectional moving robot device of claim 4, wherein the control unit transmits a traveling command signal according to a target value determined by using data measured by a force/torque sensor of the omnidirectional moving robot device and the force and torque data of the other moving robot device obtained by the communication unit.

6. The omnidirectional moving robot device of claim 1, wherein the omnidirectional wheel comprises at least one of a mecanum wheel, an onmi-wheel, and a swivel wheel.

7. The omnidirectional moving robot device of claim 6, wherein the sensor is disposed in each link of a steward platform connecting a lower plate constituting a robot body and an upper plate on which an object to be conveyed is mounted.

8. A system for object conveyance using an omnidirectional moving robot device including a force/torque sensor, the system for object conveyance comprising:
   a master moving robot including a first force/torque sensor; and
   a slave moving robot configured to transmit data obtained by a second force/torque sensor to the master moving robot and travel upon receiving a traveling command signal from the master moving robot,
   wherein the master moving robot adds data obtained by the first force/torque sensor and the data obtained by the second force/torque sensor to generate target force and target torque values and performs a force control algorithm to generate a calculation value, compares the calculation value with a target speed, and determines whether to maintain or change a current traveling speed of the master moving robot and the slave moving robot according to a comparison result.

9. A method for object conveyance using an omnidirectional moving robot device including a force/torque sensor, the method for object conveyance comprising:
   (a) receiving target speed and direction data regarding object conveyance;
   (b) obtaining IDs and force/torque sensor values of a master moving robot and a slave moving robot; and
   (c) transmitting a traveling command signal generated by using the force/torque sensor values to convey an object in the target speed and direction,
   wherein operation (c) comprises determining target force and target torque values by adding the force/torque sensor values obtained by the master moving robot and the slave moving robot, performing a force control algorithm to generate a calculation value, comparing the calculation value with a target speed, and determining whether to maintain or change a current traveling speed of the master moving robot and the slave moving robot according to a comparison result.

10. The method for object conveyance of claim 9, further comprising:
    (d) monitoring whether the force/torque sensor value of the master moving robot and the slave moving robot are changed, after operation (c).

* * * * *